(12) United States Patent
Rofougaran

(10) Patent No.: US 8,849,347 B2
(45) Date of Patent: *Sep. 30, 2014

(54) METHOD AND SYSTEM FOR A TRANSCEIVER FOR BLUETOOTH AND NEAR FIELD COMMUNICATION (NFC)

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,180

(22) Filed: Jan. 10, 2014

(65) Prior Publication Data

US 2014/0127997 A1    May 8, 2014

Related U.S. Application Data

(63) Continuation of application No. 11/425,571, filed on Jun. 21, 2006, now Pat. No. 8,660,604.

(51) Int. Cl.
| H04M 1/00 | (2006.01) |
| H04B 1/40 | (2006.01) |
| H04W 88/06 | (2009.01) |
| H04B 5/00 | (2006.01) |
| H04B 5/02 | (2006.01) |

(52) U.S. Cl.
CPC .. *H04B 5/02* (2013.01); *H04B 1/40* (2013.01); *H04W 88/06* (2013.01); *H04B 5/0006* (2013.01)
USPC ............... 455/553.1; 455/552.1; 455/41.2; 455/83; 455/84; 455/87; 455/183.1; 455/183.2

(58) Field of Classification Search
USPC ........... 455/41.2, 78–87, 552.1, 553.1, 164.1, 455/164.2, 165.1, 183.1, 183.2, 186.1
See application file for complete search history.

(56) References Cited

U.S. PATENT DOCUMENTS

| 5,519,887 | A  * | 5/1996 | Lieu ............................ 455/266 |
| 6,609,010 | B1 * | 8/2003 | Dolle et al. ................ 455/552.1 |
| 6,728,517 | B2 * | 4/2004 | Sugar et al. .................... 455/73 |
| 6,904,266 | B1 * | 6/2005 | Jin et al. .......................... 455/20 |
| 2002/0137460 | A1 * | 9/2002 | Sun et al. ........................ 455/41 |
| 2003/0194972 | A1 * | 10/2003 | Harada et al. .................. 455/69 |

* cited by examiner

*Primary Examiner* — Tuan A Tran
(74) *Attorney, Agent, or Firm* — Oblon, Spivak, McClelland, Maier & Neustadt, L.L.P.

(57) ABSTRACT

Frequency conversion methods and systems are disclosed for a transceiver for personal area networks (PAN) and near field communication (NFC). NFC data may be received and/or transmitted via the NFC radio and PAN data may be received and/or transmitted via the PAN radio. With an integration of frequency conversion for PAN and NFC, both systems may operate from a single frequency source, thereby reducing part count and power consumption. Communication between PAN and NFC channels may be enabled via a single chip.

20 Claims, 6 Drawing Sheets

US 8,849,347 B2

METHOD AND SYSTEM FOR A TRANSCEIVER FOR BLUETOOTH AND NEAR FIELD COMMUNICATION (NFC)

CROSS-REFERENCE TO RELATED APPLICATIONS/INCORPORATION BY REFERENCE

This application is a continuation of, and claims priority to, U.S. patent application Ser. No. 11/425,571, entitled "METHOD AND SYSTEM FOR A TRANSCEIVER FOR BLUETOOTH AND NEAR FIELD COMMUNICATION (NFC)," and filed on Jun. 21, 2006.

This application also makes reference to:
U.S. application Ser. No. 11/425,551 filed on Jun. 21, 2006; and
U.S. application Ser. No. 11/425,558 filed on Jun. 21, 2006.

Each of the above stated applications is hereby incorporated herein by reference in its entirety.

FIELD OF THE INVENTION

Certain embodiments of the invention relate to Bluetooth and near field communication (NFC) technologies. More specifically, certain embodiments of the invention relate to a method and system for a transceiver for Bluetooth and near field communication.

BACKGROUND OF THE INVENTION

With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset while freeing to perform other activities. Other users may have portable electronic devices that may enable them to play stored audio content and/or receive audio content via broadcast communication, for example.

However, integrating multiple audio communication technologies into a single device may be costly. Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cellphone that incorporates Bluetooth and Wireless LAN may pose certain coexistence problems caused by the close proximity of the Bluetooth and WLAN frequency converters.

Furthermore, simultaneous use of a plurality of radios in a handheld communication device may result in significant increases in power consumption. Power being a precious commodity in most wireless mobile devices, combining devices such as a cellular radio, a Bluetooth radio and a WLAN radio requires careful design and implementation in order to minimize battery usage. Additional overhead such as sophisticated power monitoring and power management techniques are required in order to maximize battery life.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a transceiver for Bluetooth and near field communication, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
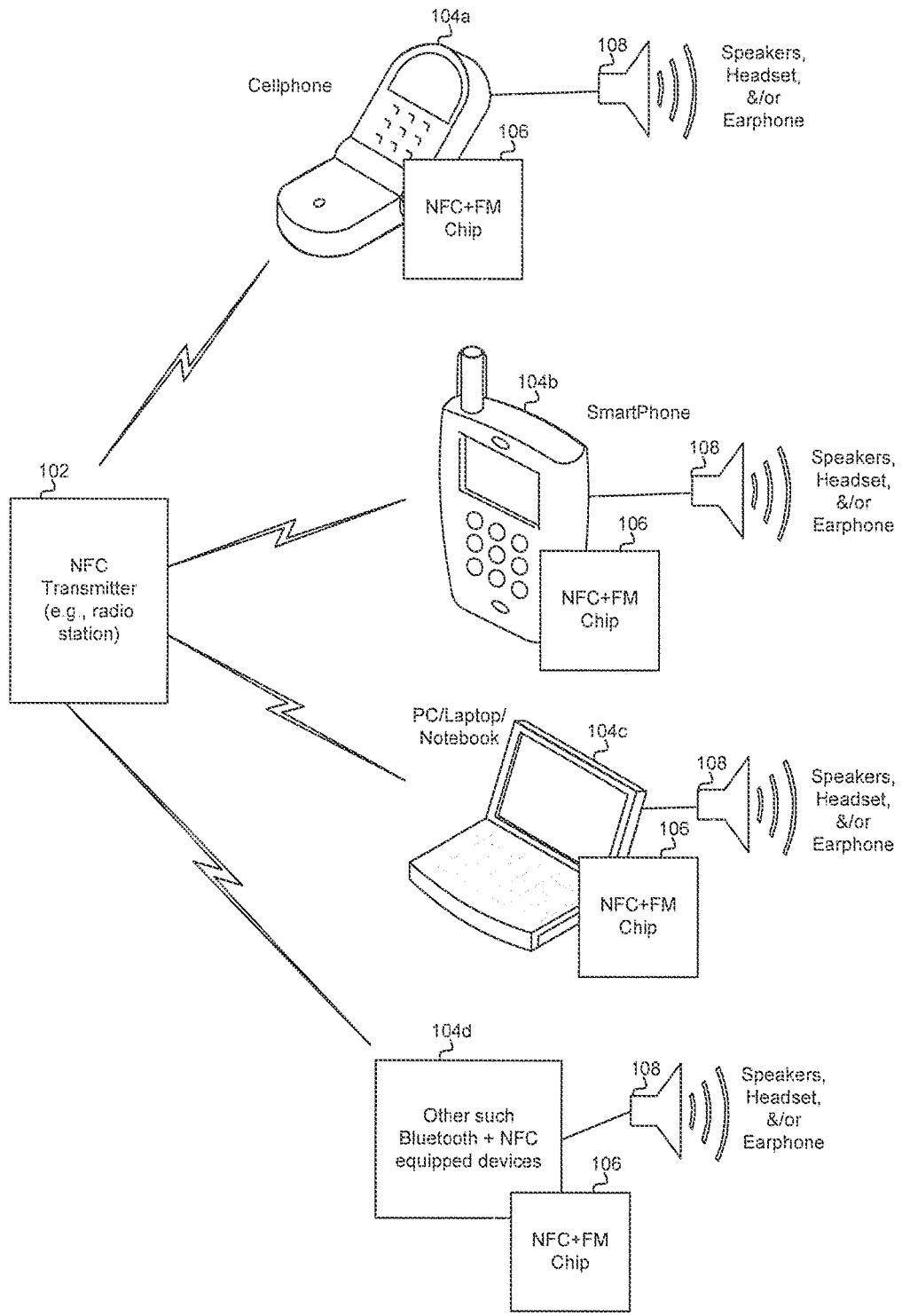
FIG. 1A is a block diagram of an exemplary NFC transmitter that communicates with handheld devices that utilize a single chip with integrated Bluetooth and NFC radios, in accordance with an embodiment of the invention.

Certain embodiments of the invention may be found in a frequency conversion method and system for a transceiver for Bluetooth and near field communication. Certain embodiments of the invention may incorporate a single chip with Bluetooth and NFC. Aspects of the method and system may comprise a single chip that comprises a Bluetooth radio, an NFC radio, a processor system, and a peripheral transfer unit (PTU). NFC data may be received and/or transmitted via the NFC radio and Bluetooth data may be received and/or transmitted via the Bluetooth radio. The PTU may support a plurality of digital and analog interfaces that provide flexibility with the handling of data. A processor in the processor system may enable time-multiplexed processing of NFC data and processing of Bluetooth data. The single chip may operate in an NFC-only mode, a Bluetooth-only mode, and an NFC-Bluetooth mode. The single chip may reduce power consumption by disabling portions of the Bluetooth radio during NFC-only mode and/or disabling analog circuitry when performing digital processing. Communication between Bluetooth and NFC channels may be enabled via the single chip.

Near Field Communication (NFC) is a low speed communication protocol. NFC may be used, for example, to set up a Bluetooth communication link between two computers by simply touching the two computers to open a connection to exchange the parameters of the Bluetooth communication. A Bluetooth communication session may be established as a second step of this procedure without any human interference. Once the communication session is established, the computers may be moved away from each other but the communication may continue via the Bluetooth communication session that was established previously. The same procedure may be used to establish a wireless link, for example, Bluetooth, or WiFi, between two computers or consumer electronics devices like TVs, laptop computers, PDAs, mobile phones, and/or smartphones.

The NFC protocol is based on a wireless interface in which there are always two parties to the communication. Accordingly, the protocol may be referred to as a peer-to-peer communication protocol. The NFC protocol may be utilized to establish wireless network connections between network appliances and consumer electronics devices. The NFC interfaces operate in the unregulated RF band of 13.56 MHz. This means that no restrictions are applied and no licenses are required for the use of NFC devices in this RF band. Of course, each country imposes certain limitations on the electromagnetic emissions in this RF band. The limitations mean that, in practice, the distance at which the devices may connect with each other is restricted and this distance may vary from country to country. Operating distances of 0~20 cm may be generally utilized for NFC. The bit rate=(D×fc)/128, where $D=2^N$ and N=0 to 6. Data may be Manchester encoded by ASK modulation.

As is often the case with the devices sharing a single RF band, the communication is half-duplex. The devices may implement a "listen before talk" policy, in which a device first listens on the carrier frequency and start transmitting a signal only if no other transmitting device is detected.

The NFC protocol distinguishes between an initiator and a target of the communication. Any device may be either an Initiator or a target. The initiator is the device that initiates and controls the exchange of data. The target is the device that answers the request from the Initiator. The NFC protocol also distinguishes between two modes of operation, namely, an active mode and a passive mode. NFC compliant devices may support both communication modes. In the active mode of communication, the initiator and target devices generate their own RF field to carry the data. In the passive mode of communication, only one device generates the RF field while the other device uses load modulation to transfer the data. The NFC protocol specifies that the Initiator is the device responsible to generate the RF field.

Communication using NFC protocol is desirable since it provides some features not found in other general-purpose protocols. First of all, it is a very short-range protocol. It supports communication at distances measured in centimeters. The devices have to be literally almost touched to establish the link between them. This has two important consequences. First, the devices may rely on the protocol to be inherently secured since the devices must be placed very close to each other. It is easy to control whether the two devices communicate by simply placing them next to each other or keeping them apart. Secondly, the procedure utilized for establishing the protocol is inherently familiar to people, since if it is desirable to have two devices communicate, the two devices may be brought with range, of the order of centimeters, of each other. This allows for the establishment of a network connection between the devices to be completely automated and transparent. The whole process may appear as though the devices recognize each other by touch and connect to each other once touching occurs.

Another important feature of this protocol is the support for the passive mode of communication. This is very important for the battery-powered devices since they have to place conservation of the energy as the first priority. The protocol allows such a device, like a mobile phone, to operate in a power-saving mode, namely, the passive mode of NFC. This mode does not require both devices to generate the RF field and allows the complete communication to be powered from one side only. Of course, the device itself will still need to be powered internally but it does not have to "waste" the battery on powering the RF communication interface.

Also, the protocol may be used easily in conjunction with other protocols to select devices and automate connection set-up. As was demonstrated in the examples of use above, the parameters of other wireless protocols may be exchanged allowing for automated set-up of other, snf longer-range connections. The difficulty in using longer-range protocols like Bluetooth or Wireless Ethernet is in selecting the correct device out of the multitude of devices in the range and providing the right parameters for the connection. Using NFC, the whole procedure is simplified to a mere touch of one device to another.

FIG. 1A is a block diagram of an exemplary NFC transmitter that communicates with handheld devices that utilize a single chip with integrated Bluetooth and NFC radios, in accordance with an embodiment of the invention. Referring to FIG. 1A, there is shown an NFC transmitter 102, a cellular phone 104a, a smart phone 104b, a computer 104c, and an exemplary NFC and Bluetooth-equipped device 104d. The NFC transmitter 102 may be implemented as part of a radio station or other broadcasting device, for example. Each of the cellular phone 104a, the smart phone 104b, the computer 104c, and the exemplary NFC and Bluetooth-equipped device 104d may comprise a single chip 106 with integrated Bluetooth and NFC radios for supporting NFC and Bluetooth data communications. The NFC transmitter 102 may enable communication of NFC audio data to the devices shown in FIG. 1A by utilizing the single chip 106. Each of the devices in FIG. 1A may comprise and/or may be communicatively coupled to a listening device 108 such as a speaker, a headset, or an earphone, for example.

The cellular phone 104a may be enabled to receive an NFC transmission signal from the NFC transmitter 102. The user of the cellular phone 104a may then listen to the transmission via the listening device 108. The cellular phone 104a may comprise a "one-touch" programming feature that enables access to specifically desired broadcasts, like weather, sports, stock quotes, or news, for example. The smart phone 104b may be enabled to receive an NFC transmission signal from the NFC transmitter 102. The user of the smart phone 104b may then listen to the transmission via the listening device 108.

The computer 104c may be any one of a desktop, laptop, notebook, tablet, and a PDA, for example. The computer 104c may be enabled to receive an NFC transmission signal from the NFC transmitter 102. The user of the computer 104c may then listen to the transmission via the listening device 108. The computer 104c may comprise software menus that enable configuration of listening options and enable quick access to favorite options, for example. While a cellular phone, a smart phone, computing devices, and other devices have been shown in FIG. 1A, the single chip 106 may be utilized in a plurality of other devices and/or systems that receive and use Bluetooth and/or NFC signals. In one embodiment of the invention, the single chip Bluetooth and NFC radio may be utilized in a system comprising a WLAN radio.

Figure 1B:
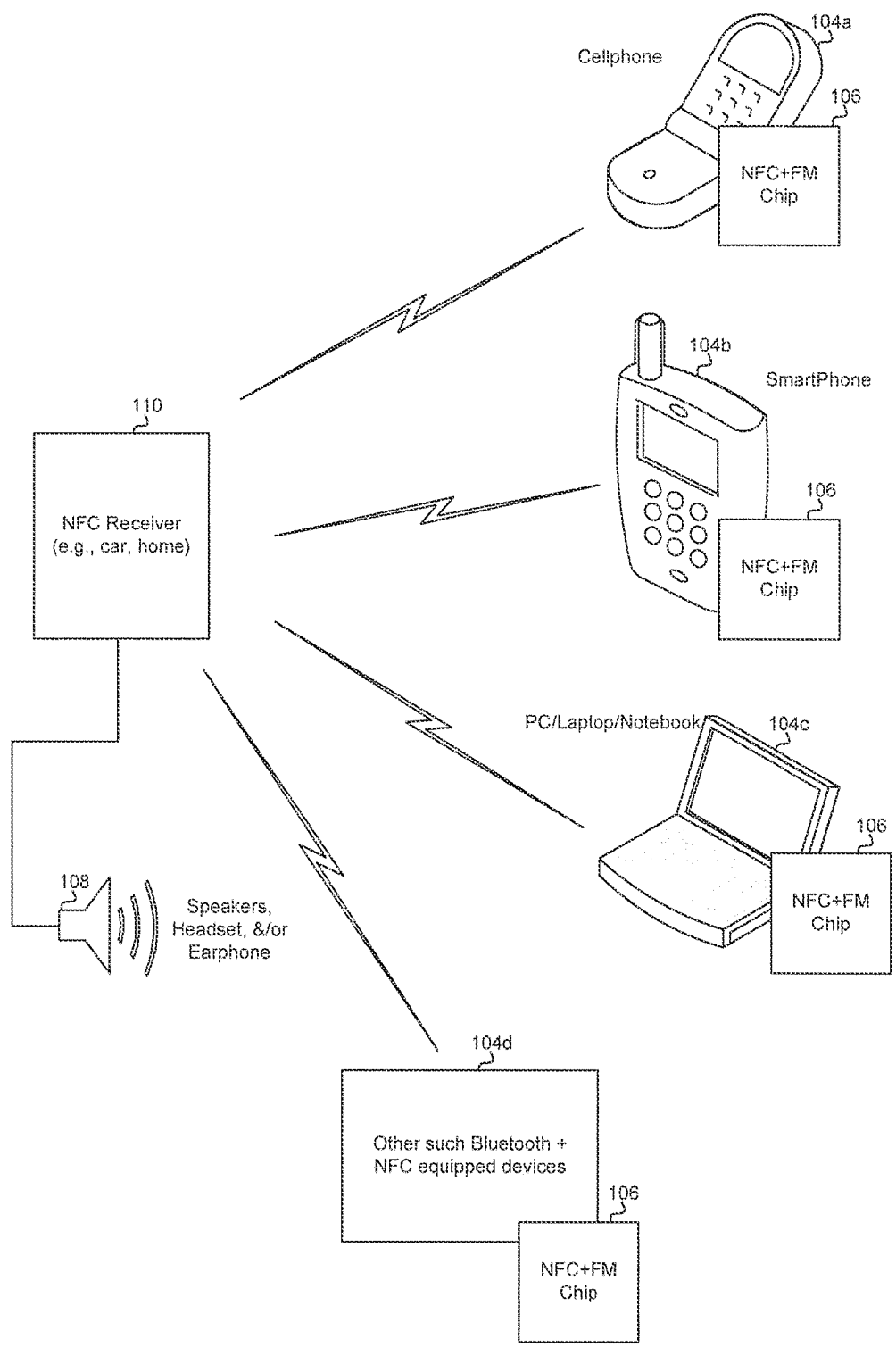
FIG. 1B is a block diagram of an exemplary NFC receiver that communicates with handheld devices that utilize a single chip with integrated Bluetooth and NFC radios, in accordance with an embodiment of the invention.

FIG. 1B is a block diagram of an exemplary NFC receiver that communicates with handheld devices that utilize a single chip with integrated Bluetooth and NFC radios, in accordance with an embodiment of the invention. Referring to FIG. 1B, there is shown an NFC receiver 110, the cellular phone 104a, the smart phone 104b, the computer 104c, and the exemplary NFC and Bluetooth-equipped device 104d. In this regard, the NFC receiver 110 may comprise and/or may be communicatively coupled to a listening device 108. While a cellular phone, a smart phone, and computing devices have been shown, a single chip that combines a Bluetooth and NFC frequency converter and/or receiver may be utilized in a plurality of other devices and/or systems that receive and use an NFC signal.

Figure 2:
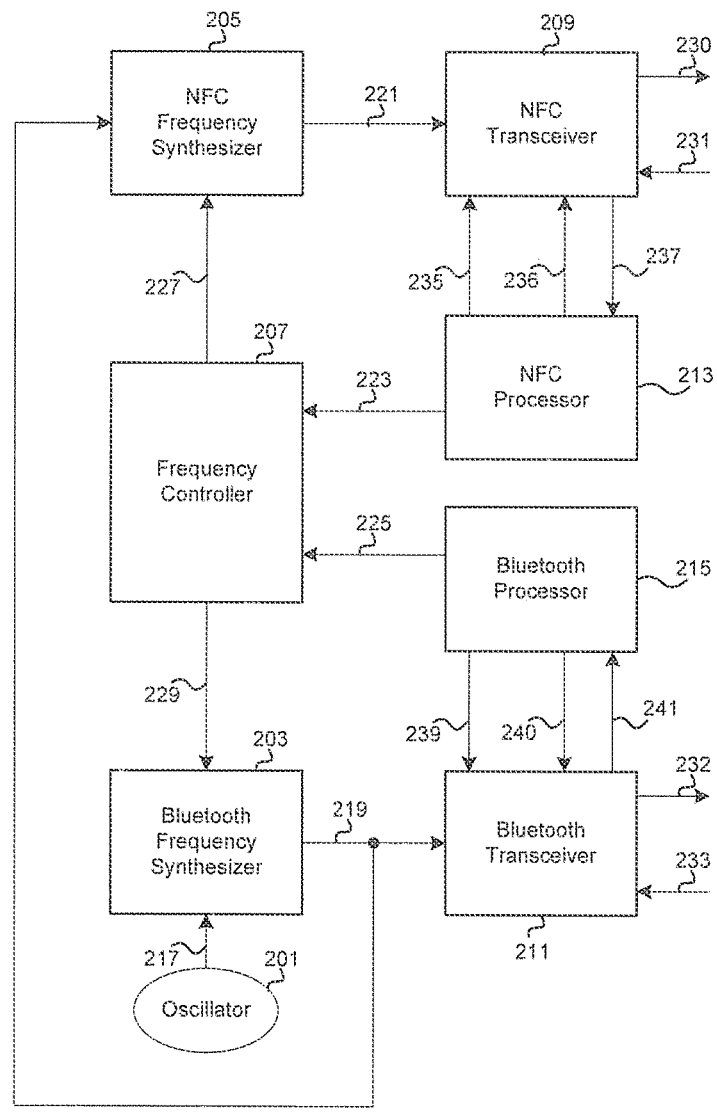
FIG. 2 is a block diagram of an exemplary system that supports Bluetooth and NFC communication in accordance with an embodiment of the invention.

FIG. 2 is a block diagram of an exemplary system that supports Bluetooth and NFC radio communication in accordance with an embodiment of the invention. The system comprises an oscillator 201, a Bluetooth frequency synthesizer 203, an NFC frequency synthesizer 205, a frequency controller 207, an NFC frequency transceiver 209, Bluetooth frequency transceiver 211, an NFC processor 213, and a Bluetooth processor 215.

The oscillator 201 may be a temperature controlled crystal oscillator. The oscillator 201 may enable generation of a clock frequency 217 (e.g. 13 MHz, 26 MHz, 24.3 MHz) that may drive the Bluetooth frequency synthesizer 203. The Bluetooth frequency synthesizer 203 may be a radio frequency generator that generates a Bluetooth carrier frequency 219. For example, the Bluetooth carrier frequency 219 may be specified by the following relationship:

$$2.4 \text{ GHz} + BT_{chan\_num} \times 1 \text{ MHz},$$

where $BT_{chan\_num}$ is the channel number for the Bluetooth communication. It should noted that the IF may not be fixed or a direct conversion but it can be any frequency.

The Bluetooth frequency synthesizer 203 may generate a Bluetooth carrier frequency 219, which may be used as an input to the Bluetooth frequency transceiver 211. The Bluetooth transceiver 211 may use the Bluetooth carrier frequency 219 to up-convert a baseband Bluetooth transmit signal 240, thereby generating an output RF Bluetooth transmit signal 232. The Bluetooth transceiver 211 may also use the Bluetooth carrier frequency 219 to down-convert an input RF Bluetooth receive signal 233, thereby generating an output baseband Bluetooth receive signal 241.

In accordance with an embodiment of the invention, the Bluetooth processor 215 may generate a control signal 239 that controls time division multiplexing of transmitting and receiving by the Bluetooth transceiver 211. The Bluetooth processor 215 may send a $BT_{chan\_num}$ via signal 225 to the frequency controller 207, which may be utilized to control operation of the Bluetooth frequency synthesizer 203. The frequency controller 207 may utilize the $BT_{chan\_num}$ signal 225 to control the Bluetooth frequency synthesizer 203 during adaptive frequency hopping (AFH).

The NFC frequency synthesizer 205 may generate an NFC carrier frequency 221 (13.56 MHz) based on the Bluetooth carrier frequency 219, the latter of which may be generated by the Bluetooth frequency synthesizer 203. The NFC frequency transceiver 209 may use the generated NFC carrier frequency 221 to up-convert an input baseband NFC transmit signal 236, thereby generating an output RF NFC transmit signal 230. The NFC transceiver 209 may also use the NFC carrier frequency 221 to down-convert an input RF NFC receive signal 231, thereby generating an output baseband NFC receive signal 237. The NFC processor 213 may generate a control signal 235 that controls time division multiplexing of transmission and reception by the NFC transceiver.

The NFC frequency synthesizer 205 may enable generation of the NFC carrier frequency 221 by dividing the Bluetooth carrier frequency 219 by a divisor 227, the latter of which may be supplied by the frequency controller 207. The frequency controller 207 may generate the divisor 227 as a ratio of the Bluetooth carrier frequency 219 (2.4 GHz+ $BT_{chan\_num} \times 1$ MHz) to the NFC carrier frequency 221 (13.56 MHz).

Figure 3:
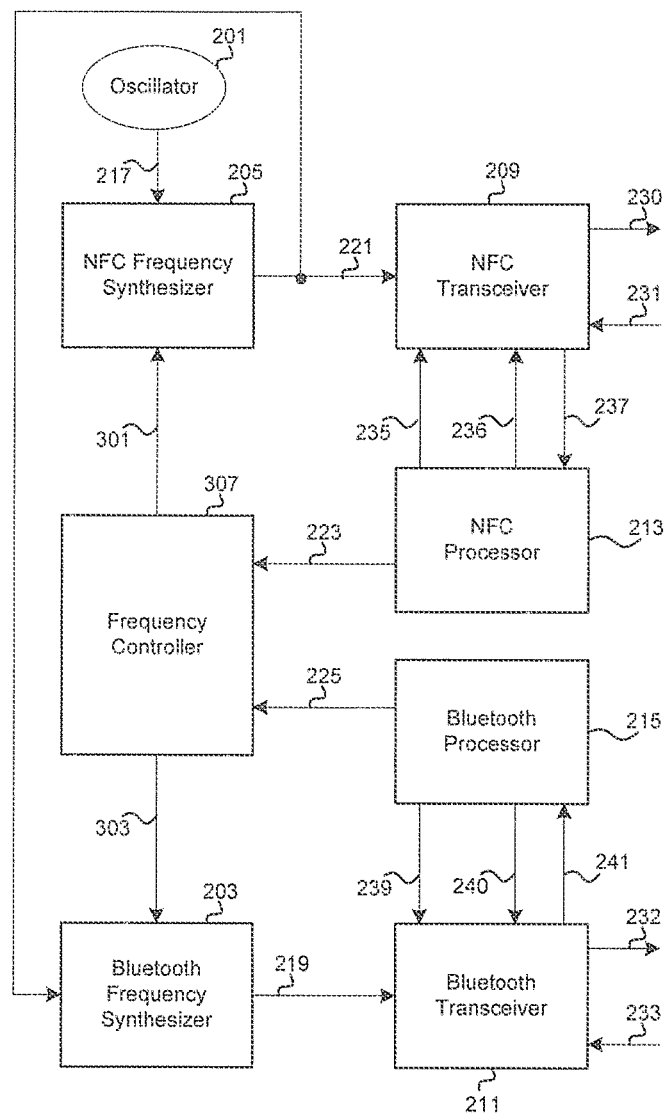
FIG. 3 is a block diagram of another exemplary system that supports Bluetooth and NFC communication in accordance with an embodiment of the invention.

FIG. 3 is a block diagram of another exemplary system that supports Bluetooth and NFC radio communication in accordance with an embodiment of the invention. Referring to FIG. 3, there is shown an oscillator 201, a Bluetooth frequency synthesizer 203, a NFC frequency synthesizer 205, a frequency controller 307, an NFC transceiver 209, Bluetooth transceiver 211, a NFC processor 213, and a Bluetooth processor 215.

The oscillator 201 may be a temperature controlled crystal oscillator. The oscillator 201 may enable generation of a clock frequency 217 signal, which may be used to drive the NFC frequency synthesizer 205. The NFC frequency synthesizer 205 may use the generated clock frequency 217 to generate a NFC carrier frequency 221, the latter of which may be used by the NFC transceiver 209 and/or the Bluetooth frequency synthesizer 203. The NFC transceiver 209 may utilize the generated NFC carrier frequency 221 to up-convert an input baseband NFC transmit signal 236, thereby generating an output RF NFC transmit signal 230. The NFC transceiver 209 may also be used to down-convert an input RF NFC received signal 231, thereby generating an output baseband NFC receive signal 237, which may be supplied as in input to the NFC processor 213. The NFC processor 213 may generate a control signal 235, which may be utilized to control a time division multiplexing of transmission and reception by the NFC transceiver 209.

The Bluetooth frequency synthesizer 203 may be a radio frequency generator that enables generation of a Bluetooth carrier frequency 219 based on the NFC carrier frequency 221. For example, the Bluetooth carrier frequency 219 may be 2.4 GHz+$BT_{chan\_num} \times 1$ MHz, where $BT_{chan\_num}$ is the channel number for the Bluetooth communication. It should noted that the IF may not be fixed or a direct conversion but it can be any frequency.

The Bluetooth transceiver 211 may use the Bluetooth carrier frequency 219 to up-convert a received baseband Bluetooth transmit signal 240, thereby generating an output RF Bluetooth transmit signal 232. The Bluetooth frequency transceiver 211 may also use the Bluetooth carrier frequency 219 to down-convert a received RF Bluetooth signal 233, thereby generating an output baseband Bluetooth signal 241.

In accordance with an embodiment of the invention, the Bluetooth processor 215 may generate a control signal 239 the may be utilized to control time division multiplexing of transmission and reception by the Bluetooth transceiver 211. The Bluetooth processor 215 may also send a $BT_{chan\_num}$ via the signal 225 to the frequency controller 307. The frequency controller 307 may utilize the $BT_{chan\_num}$ signal 225 to control the Bluetooth frequency synthesizer 203 during adaptive frequency hopping (AFH).

The Bluetooth frequency synthesizer 203 may generate the Bluetooth carrier frequency 219 by multiplying the NFC carrier frequency 221 by a scalar 303 that may be supplied by the frequency controller 307. The NFC carrier frequency 221 may be generated by the NFC synthesizer 205. The scalar 303 may be generated in the frequency controller 307. The scalar 303 may be represented as the ratio of the Bluetooth carrier frequency 219 (2.4 GHz+$BT_{chan\_num} \times 1$ MHz) to the NFC carrier frequency 221 (13.56 MHz).

Figure 4:
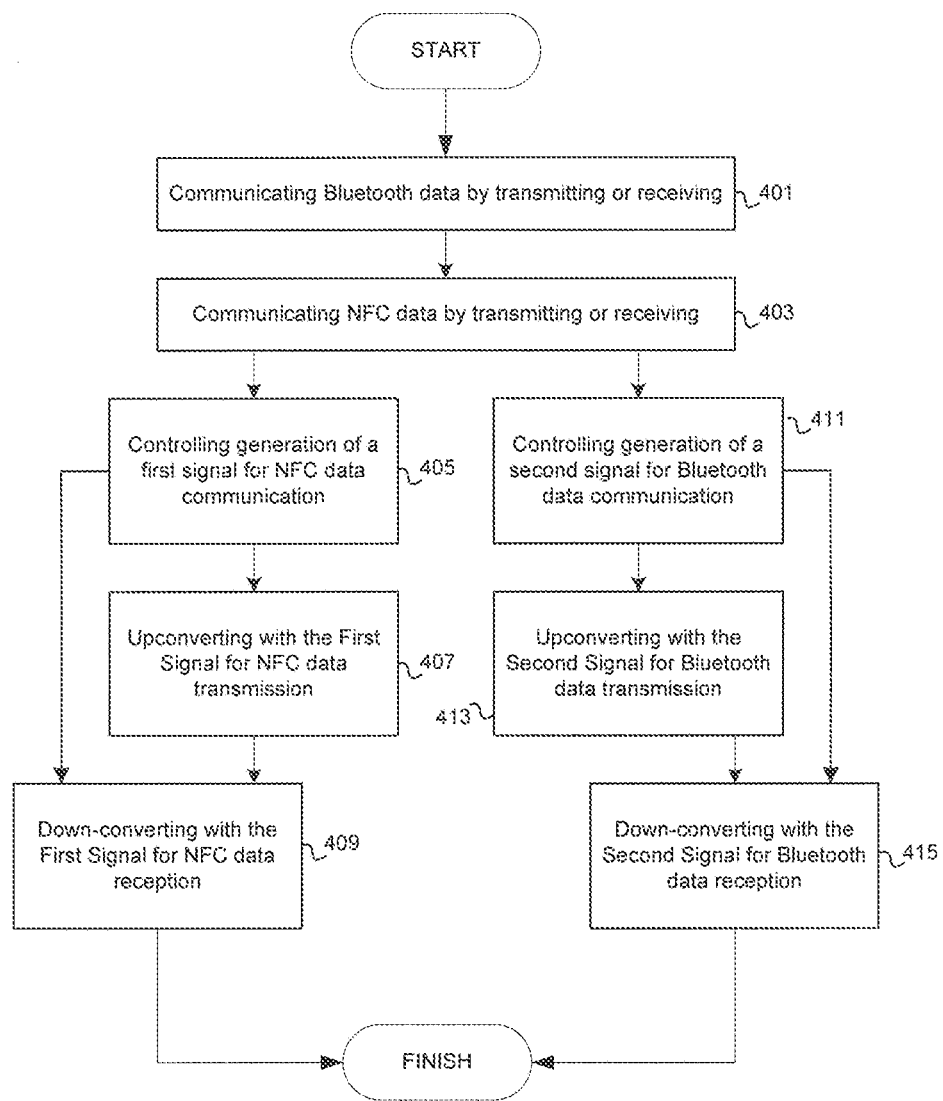
FIG. 4 is a flow diagram that illustrates exemplary steps for frequency conversion in accordance with an embodiment of the invention.

FIG. 4 is a flow diagram that illustrates exemplary steps for frequency conversion in accordance with an embodiment of the invention. Referring to FIG. 4, in step 403, NFC data may be communicated by being transmitted or being received. In step 405, controlling generation of a first signal for NFC data communication may be done. In this regard, the NFC data may be modulated on an NFC carrier frequency, which is generated for NFC data communication. In step 407, for up-converting, the NFC carrier frequency may be applied to the NFC data for transmission. In step 409, for down-converting, the NFC carrier frequency may be removed from the NFC data for reception.

In step 401, Bluetooth data may be communicated by being transmitted or being received. In 411, controlling generation of a first signal for Bluetooth data communication may be done. In this regard, the Bluetooth data may be modulated on a Bluetooth carrier frequency, which is generated for Bluetooth data communication. In step 413, for up-converting, the Bluetooth carrier frequency is applied to the Bluetooth data for transmission. In step 415, for down-converting, the Bluetooth carrier frequency may be removed from the Bluetooth data for reception.

Figure 5:
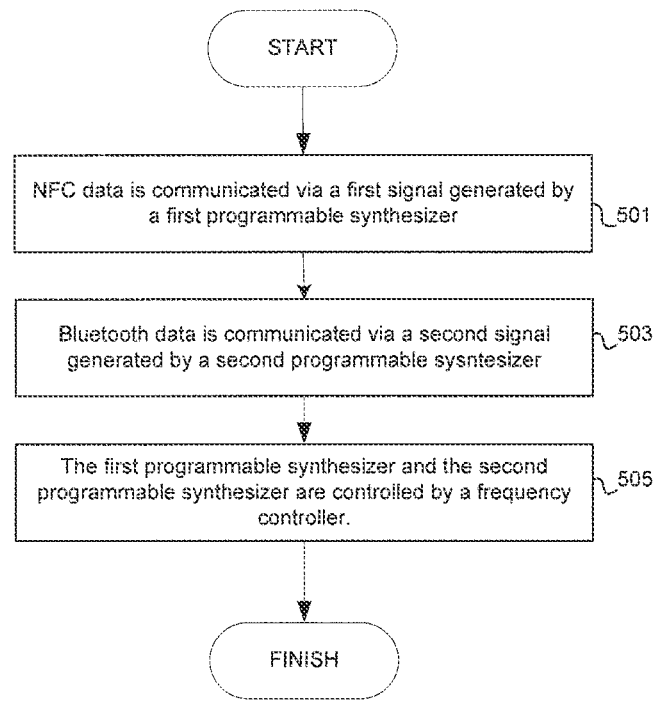
FIG. 5 is a flow diagram that illustrates an exemplary method for frequency conversion in accordance with an embodiment of the invention.

FIG. 5 is a flow diagram that illustrates an exemplary method for frequency conversion in accordance with an embodiment of the invention. In step 501, the NFC data may be communicated via a first signal 221 generated by a first programmable synthesizer 205. This NFC data may be time multiplexed between the receiving of NFC data and the transmitting of NFC data. In step 503, the Bluetooth data may be communicated via a second signal 219 generated by a second programmable synthesizer 203. This Bluetooth data may be time multiplexed between the receiving of Bluetooth data and the transmitting of Bluetooth data. The second signal 219 may change frequency according to an adaptive frequency-hopping (AFH) map for the communicated Bluetooth data.

The first programmable synthesizer 205 and second programmable synthesizer 203 may be configured in two ways. The signal 221 from the first programmable synthesizer 205 may be based on a received oscillator signal 217, and the signal from the second programmable synthesizer may be based on the signal 221 from the first programmable synthesizer 205. Alternatively, the signal from the second programmable synthesizer 203 may be based on a received oscillator signal 217, and the signal from the first programmable synthesizer 205 may be based on the signal from the second programmable synthesizer 203.

The first programmable synthesizer 205 and second programmable synthesizer 203 may be controlled via a frequency controller in 207. The first programmable synthesizer 205 and second programmable synthesizer 203 may be communicatively coupled, via the frequency controller 207, to the NFC processor 213 that enables communication of the NFC data and to the Bluetooth processor 215 that enables communication of the Bluetooth data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Therefore, at least the following is claimed:

1. A method, comprising:
generating, by a first programmable synthesizer, a personal area network (PAN) carrier frequency based at least in part on an oscillator signal received from a single oscillator;
generating, by a second programmable synthesizer that is configured to be operable simultaneously with the first programmable synthesizer, a near field communication (NFC) carrier frequency based at least in part on the PAN carrier frequency;
modulating NFC data onto the NFC carrier frequency;
modulating PAN data onto the PAN carrier frequency; and
controlling the first programmable synthesizer and the second programmable synthesizer via a single frequency controller communicatively coupled to an NFC processor and to a PAN processor.

2. The method of claim 1, wherein the PAN data comprises Bluetooth data, and the PAN processor comprises a Bluetooth processor.

3. The method of claim 1, further comprising:
transmitting, via an NFC transceiver, the NFC data that has been modulated onto the NFC carrier frequency; and
transmitting, via an PAN transceiver, the PAN data that has been modulated onto the PAN carrier frequency.

4. The method of claim 1, wherein the NFC processor and the PAN processor are separate.

5. The method of claim 1, further comprising:
providing the NFC data via the NFC processor to an NFC transceiver; and
providing the PAN data via the PAN processor to a PAN transceiver.

6. The method of claim 1, further comprising:
receiving, by the second programmable synthesizer, a divisor from the single frequency controller;
receiving, by the second programmable synthesizer, the PAN carrier frequency from the second programmable synthesizer; and
dividing, by the second programmable synthesizer, the PAN carrier frequency using the divisor in order to generate the NFC carrier frequency.

7. A method comprising:
generating, by a first programmable synthesizer, a near field communication (NFC) carrier frequency based at least in part on a received oscillator signal received from a single oscillator;
generating, by a second programmable synthesizer that is configured to be operable simultaneously with the first programmable synthesizer, a personal area network (PAN) carrier frequency based at least in part on the NFC carrier frequency;

modulating NFC data onto the NFC carrier frequency generated by the first programmable synthesizer;

modulating PAN data onto the PAN carrier frequency generated by the second programmable synthesizer; and controlling the first programmable synthesizer and the second programmable synthesizer to be simultaneously operable via a single frequency controller communicatively coupled to an NFC processor and to a PAN processor.

8. The method of claim 7, further comprising:

receiving, by the second programmable synthesizer, a scalar from the single frequency controller;

receiving, by the second programmable synthesizer, the NFC carrier frequency from the first programmable synthesizer; and multiplying, by the first programmable synthesizer, the NFC carrier frequency using the scalar in order to generate the PAN carrier frequency.

9. An electronic device comprising:

a first programmable synthesizer configured to generate a personal area network (PAN) carrier frequency based at least in part on an oscillator signal received from a single oscillator;

a second programmable synthesizer that is operable simultaneously with the first programmable synthesizer and configured to generate a near field communication (NFC) carrier frequency based at least in part on the PAN carrier frequency;

an NFC transceiver configured to modulate NFC data onto the NFC carrier frequency;

a PAN transceiver configured to modulate PAN data onto the PAN carrier frequency; and a single frequency controller configured to control the first programmable synthesizer and the second programmable synthesizer.

10. The electronic device of claim 9, wherein the single frequency controller is communicatively coupled to an NFC processor and to a PAN processor.

11. The electronic device of claim 9, wherein the single frequency controller is configured to change the PAN carrier frequency according to an adaptive frequency hopping map.

12. The electronic device of claim 9, wherein the NFC transceiver, the PAN transceiver, and the single frequency controller are integrated in a single chip.

13. An electronic device comprising:

a first programmable synthesizer configured to generate a near field communication (NFC) carrier frequency based at least in part on an oscillator signal received from a single oscillator;

a second programmable synthesizer that is operable simultaneously with the first programmable synthesizer and configured to generate a personal area network (PAN) carrier frequency based at least in part on the NFC carrier frequency;

an NFC transceiver configured to modulate NFC data onto the NFC carrier frequency;

a PAN transceiver configured to modulate PAN data onto the PAN carrier frequency; and a single frequency controller configured to control the first programmable synthesizer and the second programmable synthesizer.

14. The electronic device claim 13, wherein the single frequency controller is communicatively coupled to an NFC processor and to a PAN processor.

15. The electronic device of claim 14, wherein the NFC processor and the PAN processor are separate.

16. The electronic device of claim 13, further comprising:

an NFC transceiver configured to modulate the data onto the NFC carrier frequency; and a PAN transceiver configured to modulate the PAN data onto the PAN carrier frequency.

17. The electronic device of claim 13, wherein the second programmable synthesizer is configured to:

receiving a scalar from the single frequency controller;

receiving the NFC carrier frequency from the first programmable synthesizer; and multiplying the NFC carrier frequency using the scalar in order to generate the PAN carrier frequency.

18. The electronic device of claim 13, wherein the single frequency controller is configured to change the PAN carrier frequency according to an adaptive frequency hopping map.

19. The electronic device of claim 13, wherein the NFC transceiver, the PAN transceiver, and the single frequency controller are integrated in a single chip.

20. The electronic device of claim 13, wherein the PAN data comprises Bluetooth data, and the PAN transceiver comprises a Bluetooth transceiver.

* * * * *